United States Patent [19]
Leonard et al.

[11] Patent Number: 5,045,958
[45] Date of Patent: Sep. 3, 1991

[54] POSITIONER FOR MAGNETIC TAPE CARTRIDGE MAGAZINE

[75] Inventors: Robert E. Leonard, Denver; Joseph A. Fryberger, Longmont; Lynn C. Jacobs, Louisville, all of Colo.

[73] Assignee: Storage Technology Corporation, Louisville, Colo.

[21] Appl. No.: 488,723

[22] Filed: Mar. 5, 1990

[51] Int. Cl.$^5$ .................... G11B 15/68; G11B 17/22
[52] U.S. Cl. ........................................ 360/92; 369/38
[58] Field of Search ..................... 360/92; 369/34–39

[56] References Cited

U.S. PATENT DOCUMENTS

| | | | |
|---|---|---|---|
| 4,133,013 | 1/1979 | Fisher | 360/92 |
| 4,697,215 | 9/1987 | Hata | 360/95 |
| 4,739,491 | 4/1988 | Baldock | 360/92 |
| 4,920,432 | 4/1990 | Eggers et al. | 360/92 |
| 4,993,010 | 2/1991 | Kishimura et al. | 369/36 |

Primary Examiner—A. J. Heinz
Assistant Examiner—Jefferson Evans
Attorney, Agent, or Firm—Dorr, Carson, Sloan & Peterson

[57] ABSTRACT

The positioner for a magnetic tape cartridge magazine uses a companion cartridge magazine that holds a plurality of preloaded magnetic tape cartridges to individually access any one of the plurality of magnetic tape cartridges held by the cartridge magazine. The positioner of the present invention is able to move the cartridge magazine in a vertical direction, either up or down, such that an associated magnetic tape cartridge loader is able to selectively access any one of the plurality of magnetic tape cartridges loaded in the cartridge magazine. The positioner and loader each contain only one motor: one in the positioner for controlling the vertical motion of the cartridge magazine, one in the loader for loading a magnetic tape cartridge from the cartridge magazine into the associated tape drive. The width of the positioner is equal to or less than the width of the associated tape drive so that two positioner/loader-tape drive units can be mounted side by side.

22 Claims, 7 Drawing Sheets

POSITIONER FOR MAGNETIC TAPE CARTRIDGE MAGAZINE

CROSS REFERENCE TO RELATED APPLICATIONS

This application is related to the following patent applications: Loader for Magnetic Tape Cartridge, Ser. No. 07/489,474 filed on Mar. 5, 1990; Autoloader for Magnetic Tape Cartridges, Ser. No. 07/415,182 filed on Sept. 29, 1989; Autoloader Magazine for Tape Cartridges and Method Therefor, Ser. No. 07/414,704 filed on Sept. 29, 1989.

FIELD OF THE INVENTION

This invention relates to tape drives that handle 3480 type magnetic tape cartridges and, in particular, to a magnetic tape cartridge magazine positioner that works with a companion loader apparatus that mechanically loads and unloads the 2480 type magnetic tape cartridges into and out of the associated tape drive from a cartridge magazine that holds a plurality of magnetic tape cartridges.

PROBLEM

It is a problem in the field of 3480 type magnetic tape drives to efficiently load and unload the 3480 type magnetic tape cartridges into the associated tape drive using an automated loader.

Previous methods and devices for loading the 3480 type magnetic tape cartridges into the tape drive generally involved three methods: using a library system equipped with a magnetic tape cartridge handling robot; manually loading the magnetic tape cartridges directly into the tape drive; or using a prior art magnetic tape cartridge autoloader.

An advantage of the robot library method is its ability to store a large number of magnetic tape cartridges and its ability to select any one of the magnetic tape cartridges in the library regardless of the order in which the cartridges are stacked. However, the use of such a magnetic tape cartridge robot library system (such as the Storage Technology Corporation 4400 Automated Cartridge System) is expensive and is therefore limited by its size and cost to large computer sites.

The method of manually loading individual 3480 type magnetic tape cartridges into an associated tape drive is expensive due to the extensive labor costs and the increased probability of damage to the magnetic tape cartridge through mishandling by the operator. In addition, this method is susceptible to errors, in that the operator may load the wrong magnetic tape cartridge into the associated drive. Furthermore, the transfer of data between the tape drive and the magnetic tape cartridges is slowed if the operator does not promptly change the magnetic tape cartridge upon the completion of a read or write operation.

There are presently available a number of mechanical autoloader devices that automatically load and unload a plurality of 3480 type magnetic tape cartridges into and out of the associated tape drive.

One such apparatus utilizes a tractor drive system that sequentially feeds magnetic tape cartridges into the associated tape drive one at a time. This device is relatively large and cumbersome, approximately 16½ inches high and uses four motors to operate the system. The operator must individually load the magnetic tape cartridges one at a time into an associated slot in the tractor drive. The magnetic tape cartridges are moved in a downward direction only to the unloading position. There the magnetic tape cartridge is engaged by friction feed drive which drags the magnetic tape cartridge into position over the drive hub of the associated tape drive. The magnetic tape cartridge is then unloaded in the reverse fashion and dropped into a used cartridge tray. This autoloader is large in size and mechanically complex. In addition this autoloader is only able to move cartridges in one direction and is therefore unable to selectively access a particular cartridge from the stack of cartridges.

Another autoloader device is disclosed in U.S. Pat. No. 4,835,634 titled "Automatic Magnetic Tape Cartridge Stack Loader for Tape Drive Systems". This stack loader uses an input bin to hold and plurality of magnetic tape cartridges that can be loaded all at once by an operator. Again, this autoloader only moves the tape cartridges in a downward direction to the unloading position. The magnetic tape cartridges are sequentially fed from the input bin by a friction feed drive into position over the drive hub of the associated tape drive. The magnetic tape cartridge is unloaded in the reverse fashion and dropped into a tray that contains the used magnetic tape cartridges. This type of autoloader is again only able to move the cartridges in one direction and is therefore unable to selectively access a particular cartridge from the stack of cartridges.

Therefore, there presently exists no inexpensive magnetic tape cartridge loading system that minimizes operator labor costs and yet permits selective access to individual ones of a plurality of stacked magnetic tape cartridges.

SOLUTION

The above described problems are solved and a technical advance achieved in the field by the positioner for a magnetic tape cartridge magazine of the present invention which uses a companion cartridge magazine that holds a plurality of preloaded magnetic tape cartridges to individually access any one of the plurality of magnetic tape cartridges held by the cartridge magazine. The positioner of the present invention is able to move the cartridge magazine in a vertical direction, either up or down, such that an associated magnetic tape cartridge loader is able to selectively access any one of the plurality of magnetic tape cartridges loaded in the cartridge magazine. The positioner and loader each contain only one motor: one in the positioner for controlling the vertical motion of the cartridge magazine, one in the loader for loading a magnetic tape cartridge from the cartridge magazine into the associated tape drive. The width of the positioner is equal to or less than the width of the associated tape drive so that two positioner/loader-tape drive units can be mounted side by side.

The positioner also includes apparatus to initiate the engagement of the cartridge magazine with the magazine positioning apparatus to thereby precisely control the insertion of the cartridge magazine into the magazine positioning mechanism without relying on the operator to correctly perform this operation. This engagement mechanism also includes a clutch that disengages the magazine positioning apparatus when power is removed to enable the operator to remove the cartridge magazine from the magazine positioner without having to disable the magazine positioning apparatus.

DETAILED DESCRIPTION OF THE INVENTION

The positioner for a magnetic tape cartridge magazine uses a companion cartridge magazine that holds a plurality of preloaded magnetic tape cartridges to individually access any one of the plurality of magnetic tape cartridges held by the cartridge magazine. The positioner of the present invention is able to move the cartridge magazine in a vertical direction, either up or down, such that an associated magnetic tape cartridge loader is able to selectively access any one of the plurality of magnetic tape cartridges loaded in the cartridge magazine. The positioner and loader each contain only one motor: one in the positioner for controlling the vertical motion of the cartridge magazine, one in the loader for loading a magnetic tape cartridge from the cartridge magazine into the associated tape drive. The width of the positioner is equal to or less than the width of the associated tape drive so that two positioner/loader-tape drive units can be mounted side by side.

The magazine positioner also includes apparatus to initiate the engagement of the cartridge magazine with the magazine positioning apparatus to thereby precisely control the insertion of the cartridge magazine into the magazine positioning mechanism without relying on the operator to correctly perform this operation. This engagement mechanism also includes a clutch that disengages the magazine positioning apparatus when power is removed to enable the operator to remove the cartridge magazine from the positioner without having to disable the magazine positioning apparatus.

Positioner Architecture

Figure 1:
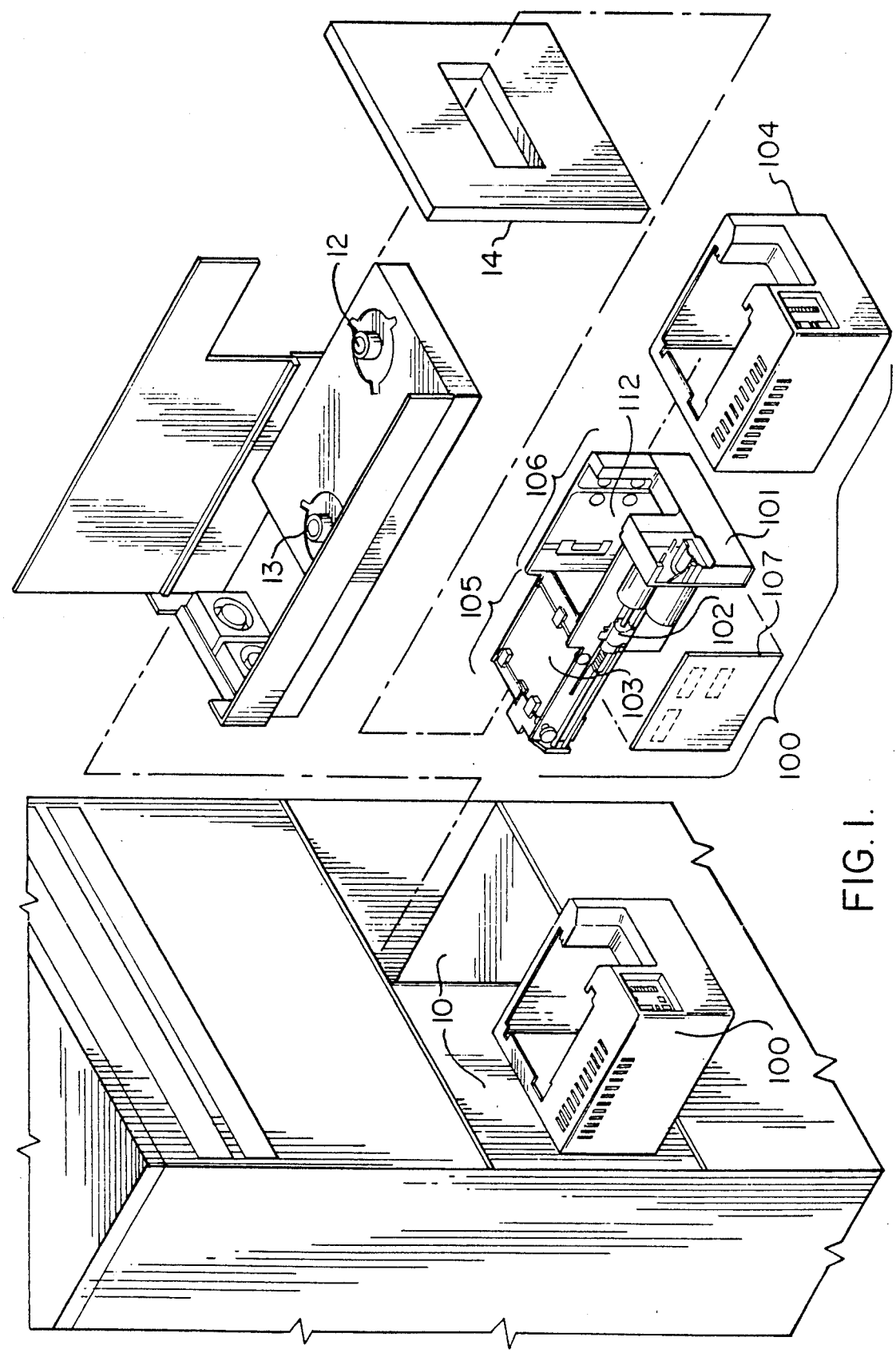
FIG. 1 is an exploded view of the magazine positioner of the present invention.
Figure 2:
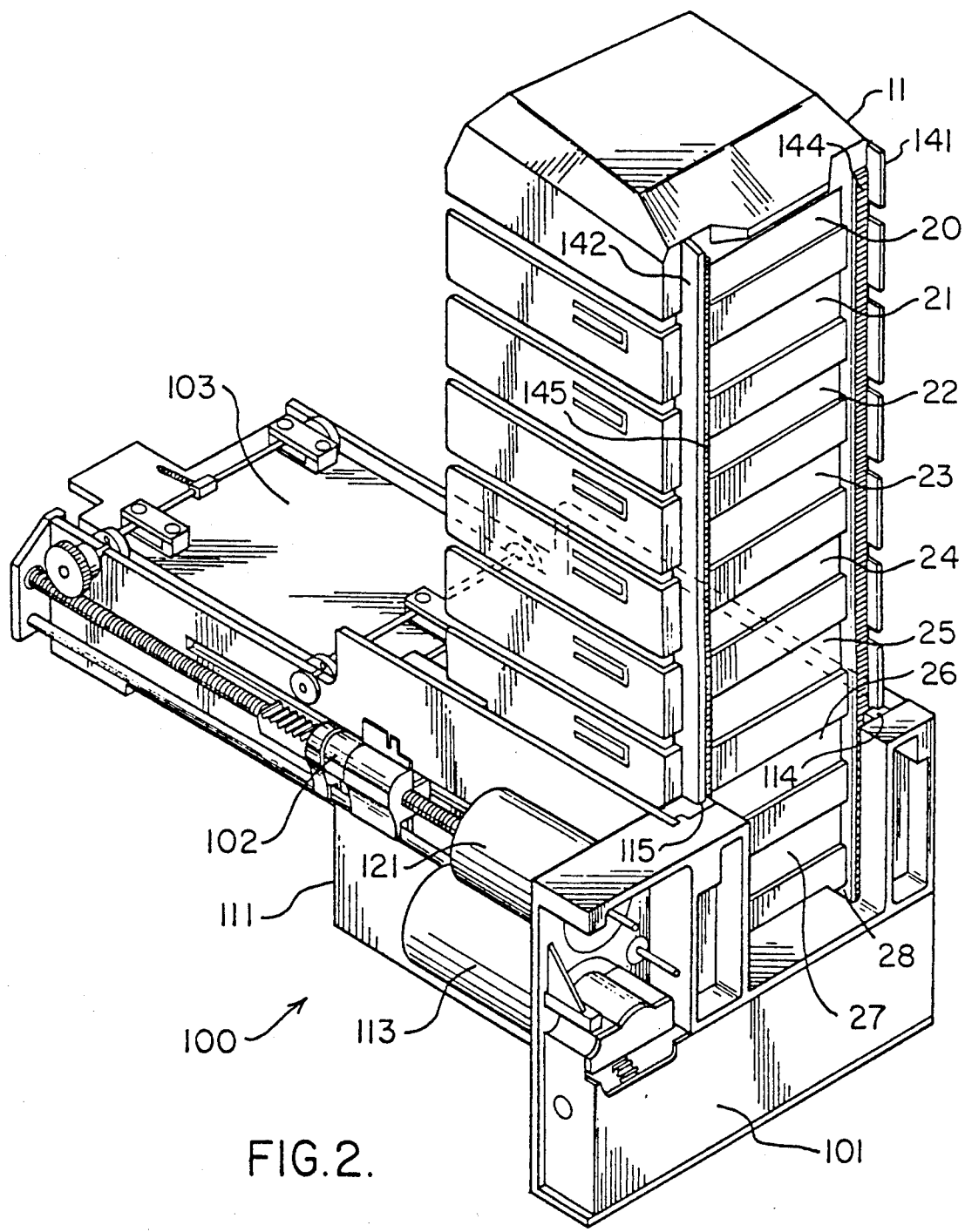
FIG. 2 is a front perspective view of the magazine positioner with a magnetic tape cartridge magazine inserted therein.

FIG. 2 illustrates a front perspective view of the magazine positioner and an associated loader for magnetic tape cartridges, while FIG. 1 illustrates an exploded view. As illustrated in FIG. 2, magazine positioner and associated loader 100 is mounted on the front of an associated tape drive 10 and functions to load and unload 3480 type magnetic tape cartridges therefrom. Magazine positioner and associated loader 100 operate in conjunction with a cartridge magazine 11 that is equipped to hold a plurality of magnetic tape cartridges 20-29. Cartridge magazine 11 illustrated in FIG. 2 contains ten 3480 type magnetic tape cartridges for illustration purposes only. The exact number of magnetic tape cartridges is a function of the particular cartridge magazine that is used. The associated tape drive 10 is a standard commercially available magnetic tape drive that is equipped to read and write data from 3480 type magnetic tape cartridges. Tape drive 10 contains the associated well known read and write circuitry (not shown) that is used for this purpose. The magnetic tape cartridge is typically loaded into the front of tape drive 10 and placed onto a drive hub 12 that functions with a take up reel 13 in well known fashion to transport the magnetic tape that is stored on the magnetic tape cartridge across the associated read/write heads of tape drive 10. This magnetic tape drive apparatus 10 is commercially available and well known to the art and is not disclosed herein for the purpose of simplicity.

Tape drive 10 is a unit that is typically 9 inches in width and can be mounted in a rack or premounted in a cabinet. Magazine positioner 101 is designed such that the width of magazine positioner 101 is equal to or less than the width of tape drive 10 in order that two autoloader equipped tape drive units can be placed side by side in a rack mount environment as shown in FIG. 1. In order to achieve this particular width requirement, magazine positioner 101 is a vertically loaded compact unit that mounts directly on the front of tape drive 10 without requiring modification thereof. Magazine positioner 101 and loader 102, 103 contains a front portion 106 and a rear portion 105. The rear portion 105 fits through the opening in face plate 14 of tape drive 10 and is positioned above the drive hut 12 for loading a magnetic tape cartridge on to drive hub 12. The front portion 106 is located exterior to tape drive 10 and is enclosed by cover 104.

The use of a cartridge magazine 11 with magazine positioner 101 enables magazine positioner 101 to access magazine tape cartridges 20-29 loaded in cartridge magazine 11 in a selective fashion. That is, magazine positioner 101 can access the magnetic tape cartridges 20-29 in any particular sequence no matter how they are loaded in cartridge magazine 11. This is due to the fact that magazine positioner 101 is a bidirectionally operating apparatus that can move cartridge magazine 11 in a vertical direction either up or down to specifically access any selected one of magnetic tape cartridges 20-29 loaded in cartridge magazine 11.

In order to accomplish the above described features, magazine positioner 101 and loader 102, 103 consist of three primary sub-assemblies: magazine positioner 101, shuttle 102, and elevator 103. These three primary sub-assemblies are driven by two motors 113, 121. Motor 113 functions to operate magazine positioner 101 while motor 121 operates both shuttle 102 and elevator 103. In this fashion, motor 113 controls the vertical movement of the cartridge magazine 11 and its associated magnetic tape cartridges 20-29 while motor 121 is responsible for the horizontal movement of a selected magnetic tape cartridge that is to be transported between cartridge magazine 11 and drive hub 12 of the associated tape drive 10.

Magnetic Tape Cartridge Magazine/Magazine Positioner

Figure 5:
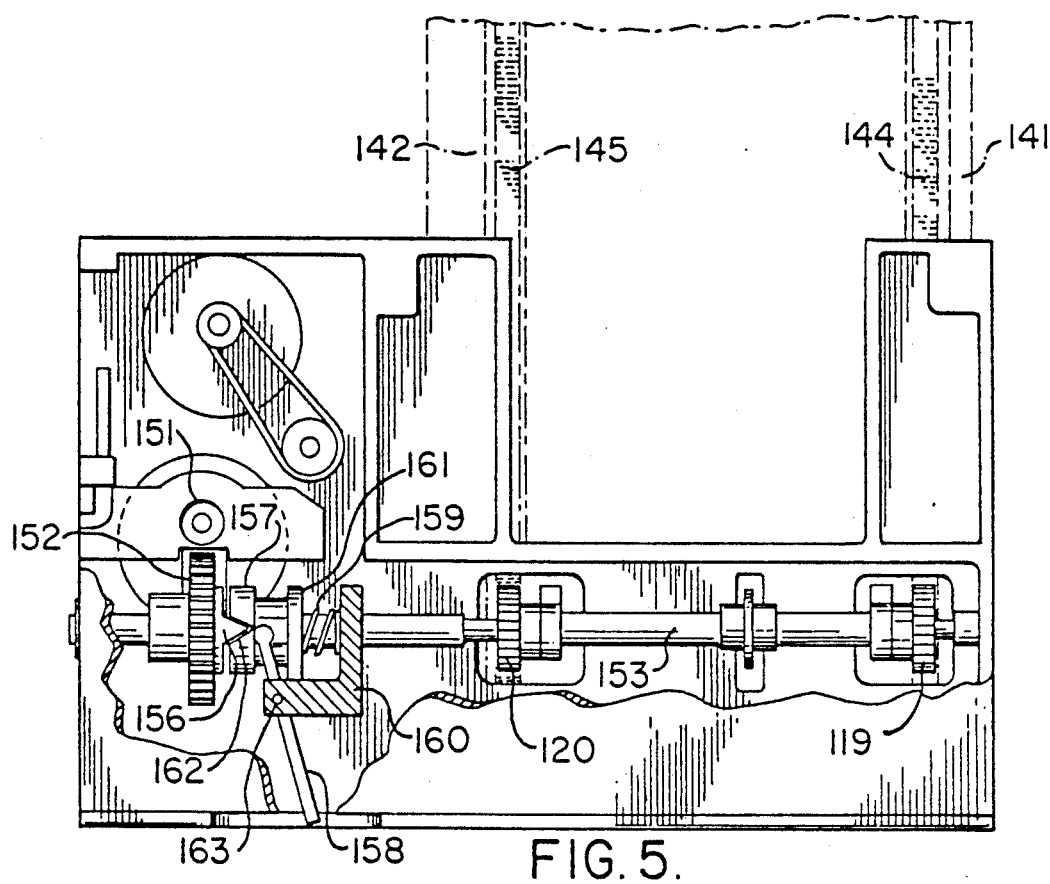
FIGS. 5-7 are detailed views of the magnetic tape cartridge positioning apparatus.
Figure 6:
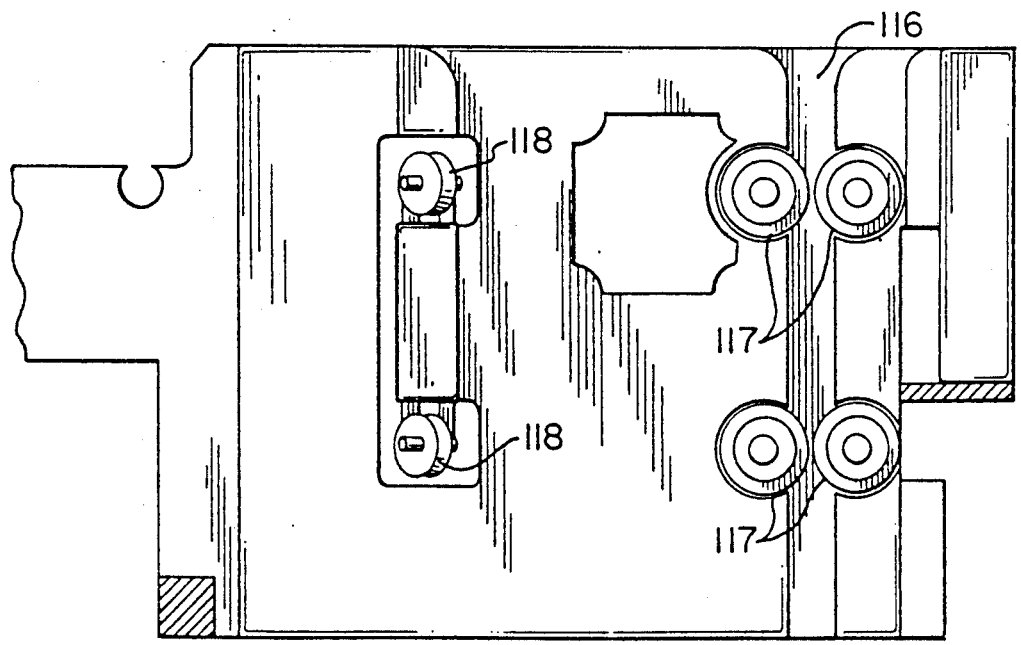
Figure 7:
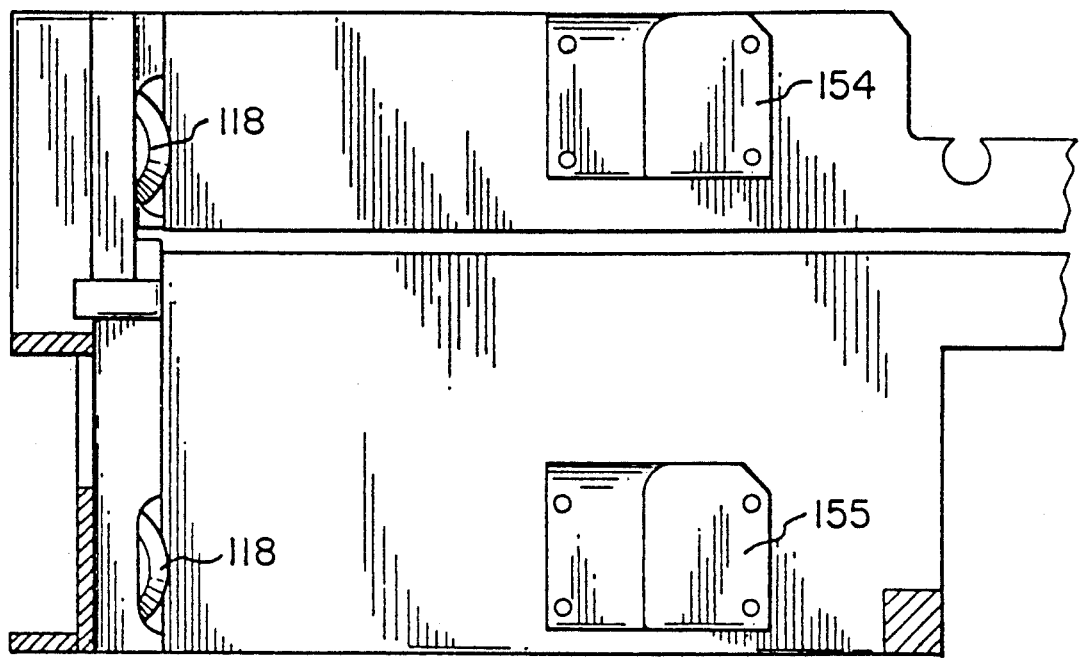

Magazine positioner 101 consists of a frame 111 that is shaped so as to form an opening 112 into which cartridge magazine 11 is inserted. Cartridge magazine 11 includes a plurality of guides shown in FIGS. 5-7 that are used to properly position and align cartridge magazine 11 inside of opening 112 so that the magnetic tape cartridge shuttle 102 can accurately and properly retrieve a selected magnetic tape cartridge from cartridge magazine 11. Included in this plurality of guides includes a pair of ribs 141, 142 located on both of the front corners of cartridge magazine 11 that fit into corresponding and mating front guides 114, 115 respectively. A rib 143 is located on one side of cartridge magazine 11 which rib 143 fits into corresponding slot 116 on the corresponding side of opening 112 in frame 111. Slot 116 is equipped with slot rollers 117 to provide rolling contact between rib 113 of cartridge magazine 11 and autoloader 100 rather than a friction sliding fit. In addition, angle rollers 118 are positioned on a 45% angle in both of the back corners, right and left, of cartridge magazine 11 to thereby maintain proper right and left alignment of cartridge magazine 11 in opening 112 as well as proper front to back positioning of cartridge magazine 11 in opening 112.

Cartridge magazine 11 is equipped with a pair of racks 144, 145 located on the frontside thereof which mate with pinion gears 119, 120 located in the front of opening 112. Pinion gears 119, 120 operate with the corresponding rack 144, 145 in rack and pinion fashion to perform a vertical translation of cartridge magazine 11 in magazine positioner 101. Motor 113 provides the motive force for the operation of gears 119, 120. The output of motor 113 is a worm gear 151 that operates a corresponding drive gear 152 to turn the shaft 153 that supports drive gears 119, 120. A set of electronic control circuitry (not shown) with slots in ribs 141 and 142 is also provided to regulate the operation of motor 113 and thereby control the vertical positioning of cartridge magazine 11. A plurality of sensors 198, 199 are also provided to identify the vertical position of cartridge magazine 11 with respect to shuttle 102 of loader 102, 103 and to determine whether a magnetic tape cartridge is present in a particular position in cartridge magazine 11. This position identification is accomplished by the use of a plurality of slots cut into rib 141, one located at each of the magnetic tape cartridges 20-29 in cartridge magazine 11. Sensor 198 detects the presence of each slot in rib 141 and the control circuit 107 can then precisely determine the position of cartridge magazine 11 in magazine positioner 101. There is also a single slot cut into the bottom of rib 142 so that sensor 199 can detect its presence, thereby providing a datum point indicative of the bottom of cartridge magazine 11.

A further feature of magazine positioner 101 is a clutch mechanism 156-162 that enables a user to disengage shaft 153 and gears 119, 120 from motor 113. The clutch mechanism 156-162 includes a tooth 156 on driving gear 152 that mates with a corresponding notch 162 on driver gear 157. The driving 152 and driven 157 gears are held together in proximate relationship by the action of spring 159, wound coaxially on shaft 153 and supported at one end by bracket 160. Driven gear 157 is decoupled from driving gear 152 by the operation of lever 158 which is pivotally (163) connected to bracket 160. Lever 158 engages lip 161 of driven gear 157 as lever 158 rotates around pivot 163, and compresses spring 159. When tooth 156 and notch 162 are disengaged, shaft 153 is free to rotate and cartridge magazine 11 can be manually moved in a vertical direction to remove it from magazine positioner 101. This feature is particularly significant when power is removed from magazine positioner 101. Without clutch mechanism 156-162, motor 113 and its associated drive gears 151, 152 would prevent shaft 153 from rotating, thereby locking cartridge magazine 11 in autoloader 100.

Shuttle Mechanism

Shuttle 102 provides a positive mechanical engagement with the magnetic tape cartridge (ex. 29) that is positioned by magazine positioner 101. This is accomplished by the use of a positioning arm 123. Positioning arm 123 is C-shaped arm that positively engages the front and back of the magnetic tape cartridge to provide the translation of the magnetic tape cartridge from cartridge magazine 11 to elevator 103. Use of positioning arm 123 eliminates the need for a friction drive positioning apparatus as is used in prior art autoloaders. The use of a positive mechanical coupling such as positioning arm 123 reduces the possibility of the magnetic tape cartridge being mispositioned in elevator 103 or cartridge magazine 11. Furthermore, the use of positioning arm 123 simplifies the design of the magnetic tape cartridge position sensor that determines whether the magnetic tape cartridge is properly positioned for loading into elevator 103. Motor 121 is used to power both shuttle 102 and elevator 103. This is accomplished by motor 121 driving worm gear 122 which is connected to positioning arm 123 by way of a first segment 124 of magnetic coupling 124, 125.

Magnetic coupling 124, 125 includes a second segment 125 that contains a hole in the center, which hole is threaded to be in mating relationship with lead screw 122. Second segment 125 also includes runners 128 that ride on track 129 to prevent second segment 125 from rotating as lead screw 122 rotates. Therefore, runners 128 and track 129 maintain second segment 125 in a fixed position with respect to rotation around lead screw 122. As lead screw 122 rotates, second segment 125 translates along the length of lead screw 122 in a direction that is a function of the direction of rotation of lead screw 122.

First segment 124 of magnetic coupling 124, 125 is similar to second segment 125 in that it rides in coaxial fashion on lead screw 122 and is equipped with runners 130 that ride on track 129, to prevent rotation around lead screw 122. However, first segment 124 does not contain any threads in the hole through which lead screw 122 is placed. First segment 124 is free to slide along the length of lead screw 122 independent of the rotation or lack thereof of lead screw 122.

In operation, first segment 125 and second segment 125 include a magnet (not shown) at their common interfacing sides. The magnet maintains first 124 and second 125 segments in juxtaposed relationship (as shown on FIGS. 3, 4, 8) by magnetic force. As worm gear 122 rotates, second segment 125 is laterally translated from magazine positioner 101 toward elevator 103, carrying a magnetic tape cartridge in positioning arm 123. The magnetic force is sufficient to maintain first 124 and second 125 segments together. The second segment 125 of magnetic coupling 124, 125 continues its motion along worm gear 122 until positioning arm 123 properly seats the magnetic tape cartridge into elevator 123. At this point, a stop 127 blocks the further motion of first segment 124 of the magnetic coupling 124, 125. The continued revolutions of lead screw 122 cause the second segment 125 of the magnetic coupling 124, 125 to continue its lateral motion away from magazine positioner 101 thereby overcoming the magnetic force that joins first 124 and second 125 segments, separating first segment 124 from second segment 125. Second segment 125 also contains a plurality of drive teeth 126 located along its top side. Drive teeth 126 are positioned such that the lateral motion of second segment 125 engages drive teeth 126 with elevator drive gears 131.

Elevator Mechanism

The use of a magnetic coupling 124, 125 enables motor 121 to use a single lead screw 122 to power both shuttle mechanism 102 and elevator mechanism 103.

The use of magnetic coupling 124, 125 also provides a precisely controlled sequential and synchronized operation of shuttle 102 and elevator 103. The drive teeth 126 on the second segment 125 of magnetic coupling 124, 125 cause the rotation of elevator gears 131 which function to translate housing 132 in a downward direction to properly position the magnetic tape cartridge contained in elevator 103 on drive hub 12 of the associated tape drive 10.

Figure 3:
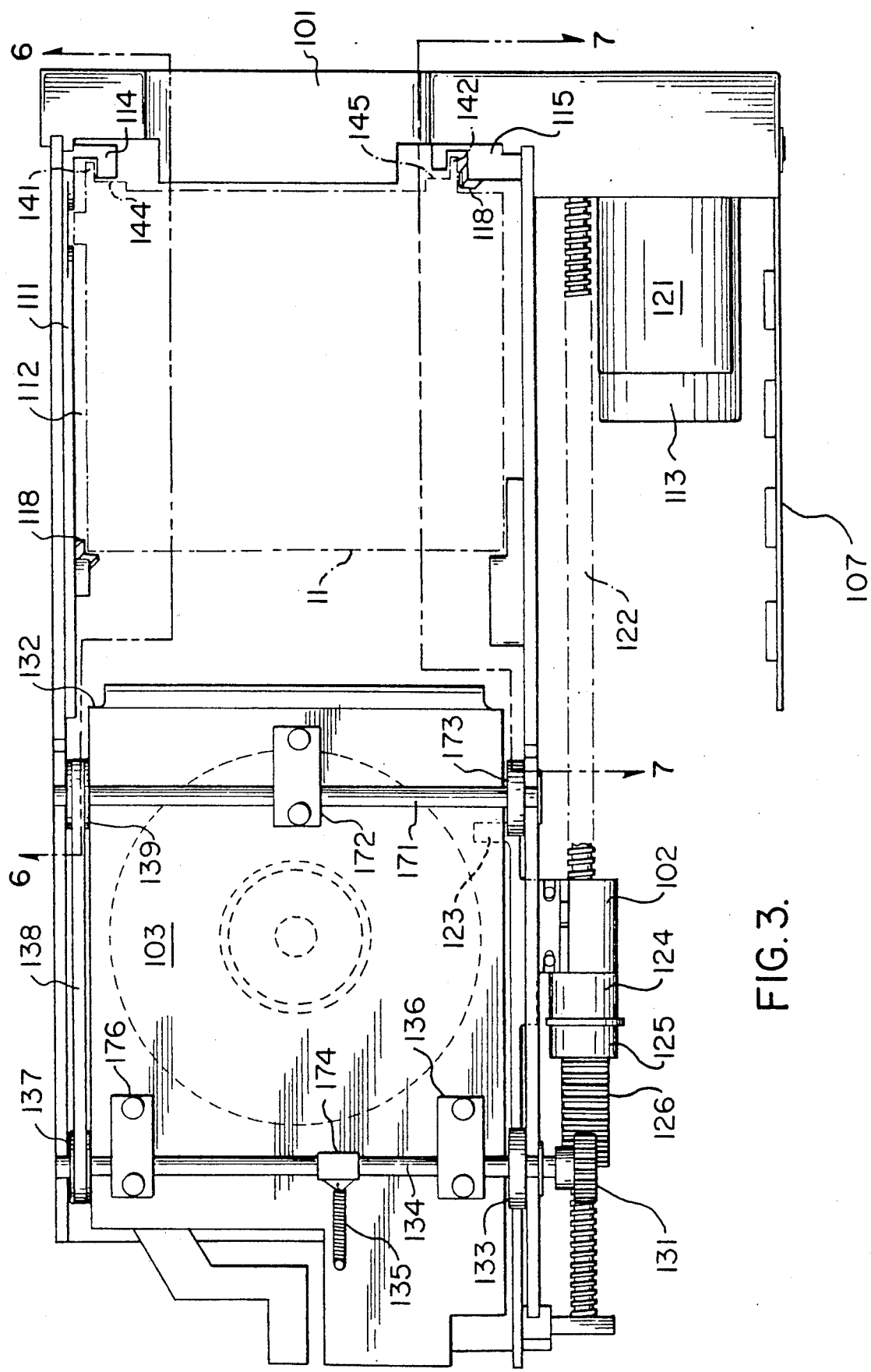
FIG. 3 is a top view of the magazine positioner.
Figure 4:
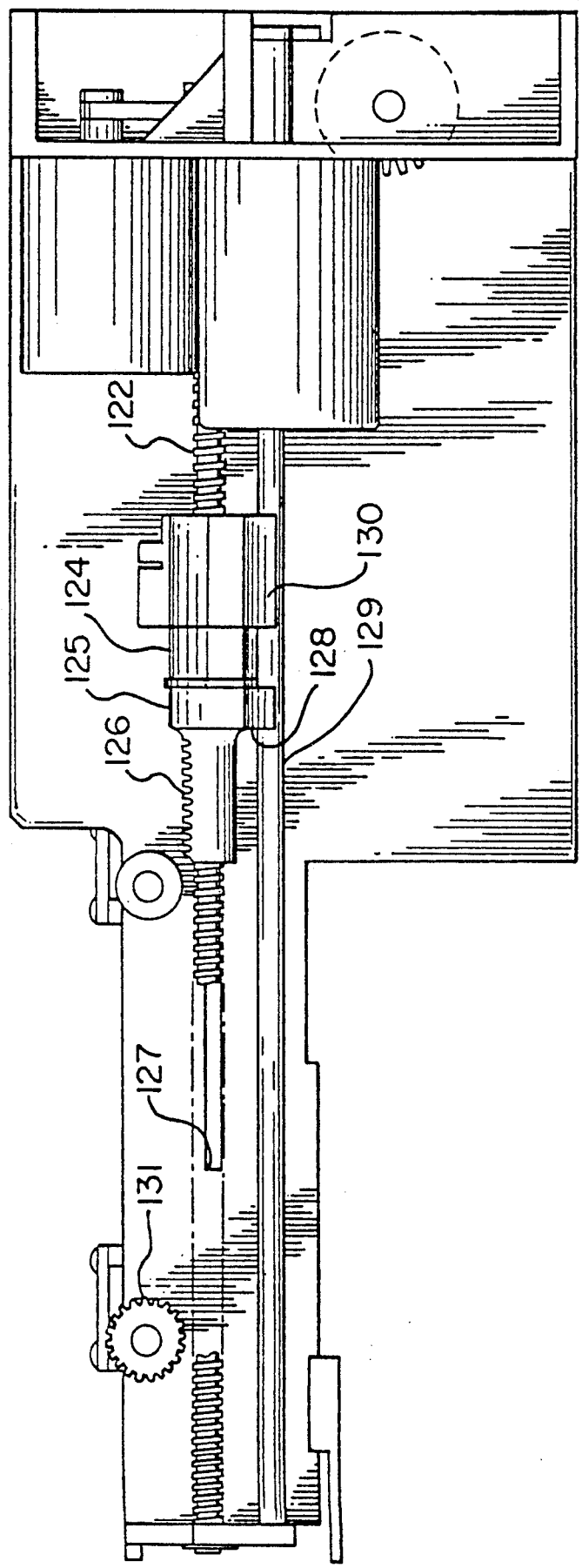
FIG. 4 is a side view of the magazine positioner.
Figure 8:
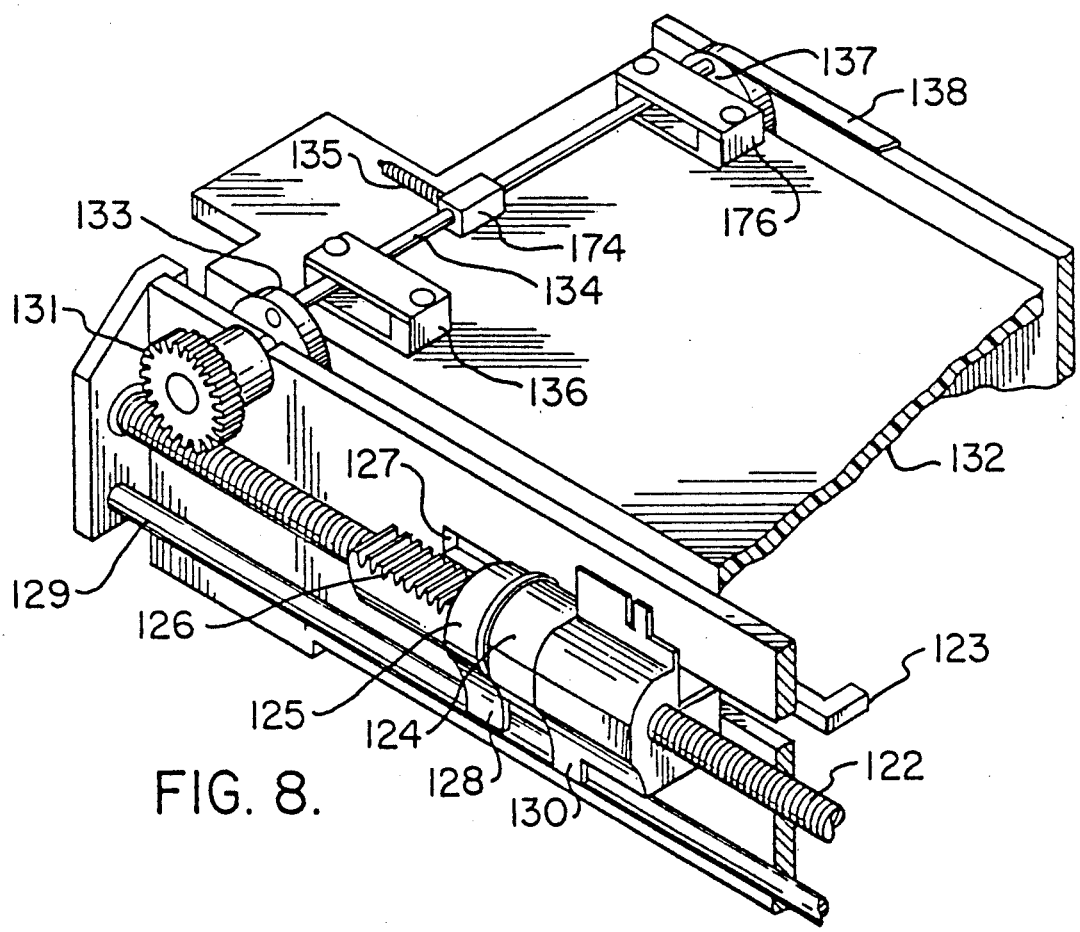
FIGS. 8-10 are detailed views of the magnetic tape cartridge shuttle and carrier apparatus.
Figure 9:
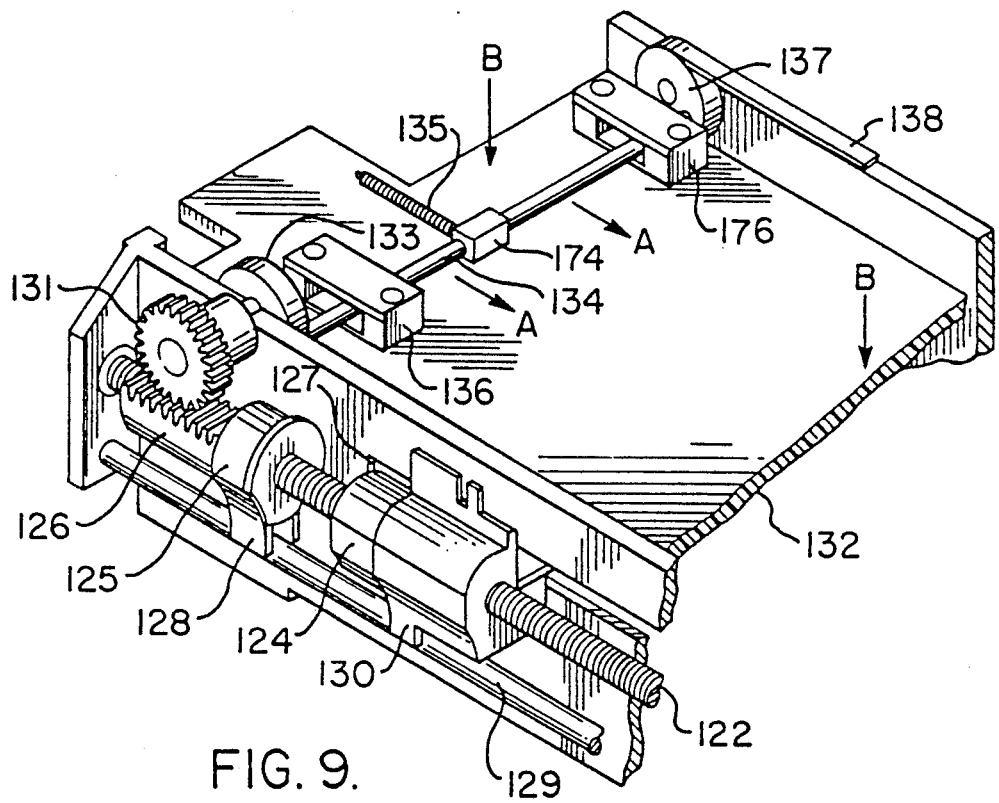
Figure 10:
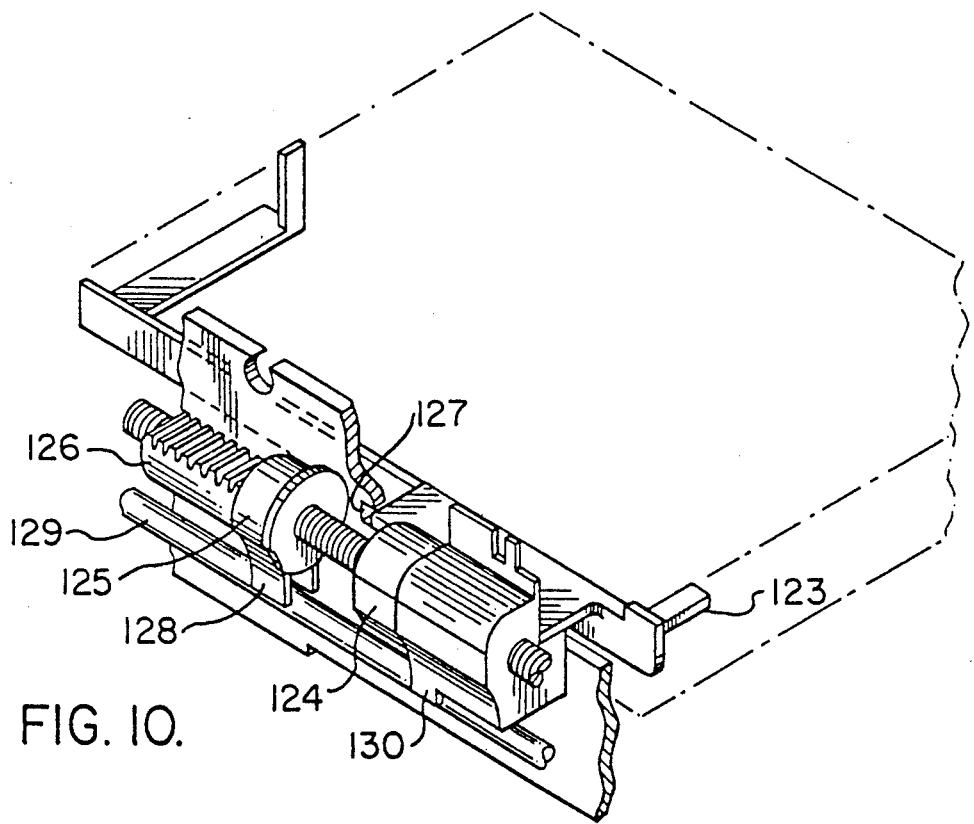

FIG. 3 provides a top view of elevator mechanism 103 whiles FIGS. 814 10 illustrate, in three steps, the operation of elevator mechanism 103 to load a magnetic tape cartridge on to drive hub 12. The lateral movement of second segment 125 causes drive teeth 126 to engage elevator drive gear 131 and rotate elevator drive gear 131 and its associated shaft 175 in a clockwise direction. The rotation of shaft 175 causes eccentric 133 to rotate in a clockwise direction as well as eccentric 137 via coupling shaft 134. Eccentric 137 is mechanically coupled via belt 138 to eccentric 139 Which in turn is coupled to eccentric 173 via coupling shaft 171. Thus, the rotation of elevator drive gear 131 causes the concurrent rotation of eccentrics 133, 137, 139, 173 and the eccentric motion of coupling shafts 134, 171. The coupling shafts 134, 171 are mechanically linked to housing 132 via brackets 136, 176, 172, and are free to move in direction A within brackets 136, 176, 172. The eccentric rotation of coupling shafts 134, 171 causes the movement of housing 132 in a direction indicated by arrow B on FIG. 9. The sequence of FIGS. 8-10 illustrate the downward motion of housing 132 as drive gears 126 cause the rotation of elevator drive gear 131. Spring 135 is coupled to coupling shaft 134 via block 174 to firmly seat housing 132 in its fully elevated and fully descended positions.

Thus, shuttle mechanism 102 and elevator mechanism 103 operate independently yet cooperatively in synchronization to laterally translate the magnetic tape cartridge from the cartridge magazine 11 to elevator mechanism 102 and to then provide the vertical positioning of the magnetic tape cartridge onto drive hub 12. Each of the sub-assemblies of magazine positioner 101 and loader 102, 103 are bidirectional in operation.

SUMMARY

Magazine positioner 101 selectively translates cartridge magazine 11 up or down in the vertical direction to access any of the cartridge slots in cartridge magazine 11. Shuttle mechanism 102 retrieves a magnetic tape cartridge from cartridge magazine 11 and transports it to elevator mechanism 103 or transports the magnetic tape cartridge from elevator mechanism 103 to cartridge magazine 11. Elevator mechanism 103 loads a magnetic tape cartridge received from shuttle mechanism 102 onto drive hub 12 or removes the magnetic tape cartridge from drive hub 12 and places this retrieved magnetic tape cartridge into shuttle mechanism 102. These three interactively cooperative yet independent sub-assemblies use only two motors to operate the entire autoloader. This enables the magazine positioner 101 and loader 102, 103 to be constructed within the constraint that the width of the apparatus must be less than or equal to the width of the associated tape drive 10. The vertical positioning capability of the magazine positioner 101 enables magnetic tape cartridges to be loaded in arbitrary order in cartridge magazine 11 and retrieved as required in any ordered sequence and timing. Cartridge magazine 11 is also equipped with a plurality of slots located on the backside thereof, which slots provide visual access to the back of each magnetic tape cartridge 20–29 stored in cartridge magazine 11. Each magnetic tape cartridge 20–29 is typically provided with a label on the backside thereof which label uniquely identifies the magnetic tape cartridge. These labels typically are printed with human readable and machine readable indicia. The labels may typically contain alphanumeric machine and human readable characters, a color coding field corresponding to each of the alphanumeric characters and an adjacently located bar code. Thus, magazine positioner 101 can be optionally equipped with a sensor to read the machine readable indicia imprinted on the labels that are placed on the back of each magnetic tape cartridge. Therefore, by coupling the output of the sensor with the electronics in the magazine positioner 101, the associated central processing unit can identify each magnetic tape cartridge that is positioned for loading into tape drive 10 by loader 102, 103. In this fashion, the central processing unit can either schedule the data read and write operations as a function of the next magnetic tape cartridge that is presented by magazine positioner 101 to the associated tape drive 10 or can use the tape cartridge identification capability of magazine positioner 101 to locate a designated magnetic tape cartridge loaded therein for reading and writing data that is queued in the central processing unit as the next operation. This capability enables an operator to load a sequence of magnetic tape cartridges into cartridge magazine 11 either in random order or even in predefined order and the magazine positioner 101 in conjunction with the central processing unit can override what the operator has done to thereby correct mistakes or search for the appropriate magnetic tape cartridge in a randomly loaded collection thereof.

While a specific embodiment of this invention has been disclosed, it is expected that those skilled in the art can and will design alternate embodiments of this invention that fall within the scope of the appended claims.

I claim:

1. In an autoloader connected to an associated tape drive, said tape drive having an opening through which said autoloader can access a drive hub located in said tape drive, apparatus for transferring magnetic tape cartridges between said drive hub and a magnetic tape cartridge magazine that is disjunct from said autoloader and bidirectionally moveable in a vertical direction that holds a plurality of preloaded magnetic tape cartridges in individual positions therein, comprising:

a gear train engagable with a mating rack on said magnetic tape cartridge magazine for controllably moving said magnetic tape cartridge magazine bidirectionally in a vertical direction;

means for positioning said magnetic tape cartridge magazine such that a selected one of said individual positions is located opposite said tape drive opening for access to said magnetic tape cartridge located therein; including:

a motor for powering said gear train; and means for coupling said motor and said gear train to enable said motor to rotate said gear train and to prevent the rotation of said gear train when said motor is not rotating.

2. The apparatus of claim 1 wherein said coupling means comprises:

a gear connected to said gear train;

worm gear connected to said motor and engagable with said gear in a 90 degree configuration.

3. The apparatus of claim 2 wherein said gear train includes:
a cam for engaging the bottom of said magazine when said magazine is first inserted into said aperture for maintaining said magazine in a predetermined vertical position in said aperture.

4. The apparatus of claim 1 wherein said positioning means further includes:
a clutch for disconnecting said gear train from said coupling means.

5. The apparatus of claim 1 further comprising:
an aperture, having at least two sides, into which said magazine slidably fits for guiding the movement of said magazine;
two or more rollers located in said aperture for guiding said magazine using rollable contact.

6. The apparatus of claim 1 further comprising:
means for storing an ordered sequence identifying two or more of said individual positions in any selected order.

7. The apparatus of claim 6 wherein said positioning means includes:
means responsive to said storing means for activating said positioning means such that each one of said individual positions identified in said sequence is located in turn opposite said tape drive opening for access to said magnetic tape cartridge located therein.

8. The apparatus of claim 1, wherein said magnetic tape cartridge magazine contains an aperture therein for each of said individual positions such that indicia imprinted on the magnetic tape cartridge contained in each of said individual positions can be viewed, further including:
means for automatically reading said indicia imprinted on said magnetic tape cartridges as said magnetic tape cartridge magazine is translated in said vertical direction.

9. The apparatus of claim 8 further including:
means for recording said indicia for each of said individual positions in said magnetic tape cartridge magazine.

10. An autoloader for transferring magnetic tape cartridges between a magnetic tape cartridge magazine that is disjunct from said autoloader and bidirectionally movable in a vertical direction and that holds a plurality of preloaded magnetic tape cartridges in individual positions therein and an associated tape drive having an opening through which said autoloader can access a drive hub contained therein comprising:
means attached to said associated tape drive for birdirectionally vertically translating said magnetic tape cartridge magazine, including:
a gear train engagable with a mating rack on said magnetic tape cartridge magazine for controllably moving said magnetic tape cartridge magazine bidirectionally in a vertical direction;
means for monitoring the vertical position of said magnetic tape cartridge magazine; and
means responsive to said monitoring means for activating said translating means, such that a selected one of said individual positions is located opposite said opening in said associated tape drive.

11. The apparatus of claim 10 wherein said translating means further includes:
a motor for powering said gear train;
means for coupling said motor and said gear train to enable said motor to rotate said gear train and to prevent the rotation of said gear train when said motor is not rotating.

12. The apparatus of claim 11 wherein said coupling means comprises:
a gear connected to said gear train;
worm gear connected to said motor and engagable with said gear in a 90 degree configuration.

13. The apparatus of claim 11 wherein said translating means further includes:
a clutch for disconnecting said gear train from said coupling means.

14. The apparatus of claim 11 wherein said gear train includes:
a cam for engaging the bottom of said magazine when said magazine is first inserted into said aperture for maintaining said magazine in a predetermined vertical position in said aperture.

15. The apparatus of claim 10 further comprising:
an aperture, having at least two sides, into which said magazine slidably fits for guiding the movement of said magazine;
two or more rollers located in said aperture for guiding said magazine using rollable contact.

16. The apparatus of claim 10 further comprising:
means for storing an ordered sequence identifying two or more of said individual positions in any selected order.

17. The apparatus of claim 16 wherein said positioning means includes:
means responsive to said storing means for activating said positioning means such that each one of said individual positioned identified in said sequence is located in turn opposite said tape drive opening for access to said magnetic tape cartridge located therein.

18. The apparatus of claim 10, wherein said magnetic tape cartridge magazine contains an aperture therein for each of said individual positions such that indicia imprinted on the magnetic tape cartridge contained in each of said individual positions can be viewed, further including:
means for automatically reading said indicia imprinted on said magnetic tape cartridges as said magnetic tape cartridge magazine is translated in said vertical direction.

19. The apparatus of claim 18 further including:
means for recording said indicia for each of said individual positions in said magnetic tape cartridge magazine.

20. In an autoloader connected to an associated tape drive of width w, said tape drive having an opening through which said autoloader can access a drive hub located in said tape drive, apparatus for transferring magnetic tape cartridges between said drive hub and a magnetic tape cartridge magazine that is disjunct from said autoloader and bidirectionally movable in a vertical direction and that holds a plurality of preloaded magnetic tape cartridges in individual positions therein, comprising:
a gear train, of width less than or equal to w, engagable with a mating rack on said magnetic tape cartridge magazine for controllably moving said magnetic tape cartridge magazine bidirectionally in a vertical direction;
means, of width equal to or less than w, for positioning said magnetic tape cartridge magazine such that a selected one of said individual positions is located opposite said tape drive opening for access to said magnetic tape cartridge located therein, including:

a motor for powering said gear train;

means for coupling said motor and said gear train to enable said motor to rotate said gear train and to prevent the rotation of said gear train when said motor is not rotating.

21. The apparatus of claim 20 wherein said coupling means comprises:

a gear connected to said gear train;

a worm gear connected to said motor and engagable with said gear in a 90 degree configuration.

22. The apparatus of claim 20 wherein said positioning means further includes:

a clutch for disconnecting said gear train from said coupling means.

* * * * *